(12) United States Patent
Bowman et al.

(10) Patent No.: US 12,266,164 B2
(45) Date of Patent: *Apr. 1, 2025

(54) CLASSIFICATION PARALLELIZATION ARCHITECTURE

(71) Applicant: Tomahawk Robotics, Inc., Melbourne, FL (US)

(72) Inventors: William S. Bowman, Melbourne, FL (US); Sean Wagoner, West Melbourne, FL (US); Andrew D. Falendysz, Grant, FL (US); Matthew D. Summer, Melbourne, FL (US); Kevin Makovy, West Melbourne, FL (US); Jeffrey S. Cooper, Centreville, VA (US); Brad Truesdell, Indialantic, FL (US)

(73) Assignee: Tomahawk Robotics, Inc., Melbourne, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/772,099

(22) Filed: Jul. 12, 2024

(65) Prior Publication Data
US 2024/0378880 A1 Nov. 14, 2024

Related U.S. Application Data

(63) Continuation of application No. 18/454,055, filed on Aug. 22, 2023, now Pat. No. 12,067,768, which is a
(Continued)

(51) Int. Cl.
G06V 10/764 (2022.01)
G05B 13/02 (2006.01)
(Continued)

(52) U.S. Cl.
CPC ......... *G06V 10/96* (2022.01); *G05B 13/0265* (2013.01); *G06V 10/764* (2022.01);
(Continued)

(58) Field of Classification Search
CPC ...... G06V 10/96; G06V 10/764; G06V 10/87; G06V 10/955; G06V 20/56; G05B 13/0265
See application file for complete search history.

(56) References Cited

U.S. PATENT DOCUMENTS

| 10,845,943 | B1 * | 11/2020 | Ansari | G06V 10/764 |
| 2019/0377345 | A1 | 12/2019 | Bachrach et al. | |
| 2020/0034627 | A1 * | 1/2020 | Zhu | G06V 10/454 |

FOREIGN PATENT DOCUMENTS

| CN | 111989915 A * 11/2020 ......... G06K 9/00791 |

OTHER PUBLICATIONS

Extended European Search Report issued in European Patent Application No. 24189393.2 on Nov. 5, 2024.

* cited by examiner

*Primary Examiner* — Carol W Chan
(74) *Attorney, Agent, or Firm* — Perkins Coie LLP

(57) ABSTRACT

Methods and systems are described herein for hosting and arbitrating algorithms for the generation of structured frames of data from one or more sources of unstructured input frames. A plurality of frames may be received from a recording device and a plurality of object types to be recognized in the plurality of frames may be determined. A determination may be made of multiple machine learning models for recognizing the object types. The frames may be sequentially input into the machine learning models to obtain a plurality of sets of objects from the plurality of machine learning models and object indicators may be received from those machine learning models. A set of composite frames with the plurality of indicators corresponding to the plurality of objects may be generated, and an output stream may be generated including the set of composite frames to be played back in chronological order.

20 Claims, 7 Drawing Sheets

Related U.S. Application Data continuation of application No. 17/571,081, filed on Jan. 7, 2022, now Pat. No. 11,776,247.

(51) Int. Cl.
  *G06V 10/70* (2022.01)
  *G06V 10/94* (2022.01)
  *G06V 10/96* (2022.01)
  *G06V 20/56* (2022.01)

(52) U.S. Cl.
  CPC ............ *G06V 10/87* (2022.01); *G06V 10/955* (2022.01); *G06V 20/56* (2022.01)

| Frame | Machine Learning Model 1 Output | Machine Learning Model 2 Output |
|---|---|---|
| Frame 1 | Object 1: Tank (255 X 375)<br>Object 1: Missile System (1155 X 900) | Object 1: Airplane (255 X 375)<br>Object 1: Drone (1155 X 900) |
| Frame 2 | Object 1: Tank (300 X 400)<br>Object 1: Missile System (1155 X 900) | No Processing |
| Frame 3 | Object 1: Tank (600 X 700)<br>Object 1: Missile System (1155 X 900) | Object 1: Airplane (255 X 375)<br>Object 1: Drone (1155 X 900) |

FIG. 5

CLASSIFICATION PARALLELIZATION ARCHITECTURE

CROSS-REFERENCE TO RELATED APPLICATION(S)

This application is a continuation of U.S. patent application Ser. No. 18/454,055, filed Aug. 22, 2023, which is a continuation of U.S. patent application Ser. No. 17/571,081, filed Jan. 7, 2022. The content of the foregoing application is incorporated herein in its entirety by reference.

BACKGROUND

Stable and reliable robotic systems are becoming increasingly common, which has contributed to the recent advancement and proliferation of unmanned system technologies. These technologies can be ground-based systems, aerial-based systems, and/or maritime-based systems. In many instances these systems are equipped with one or more cameras, one or more microphones, and/or other recording equipment. The image/sound stream from the unmanned system(s) may be sent to an operator's control device to make the operator aware of what is happening on the ground. In many cases it may be useful for the image stream to be annotated with different objects detected within the video/audio stream. Currently, objects within images/sound frames are generally detected using machine learning models. These machine learning models are generally hosted on dedicated hardware with dedicated data sources. However, in operational scenarios it may be critical to use third-party models (e.g., from entities that are able to train those models because those entities have the required training data). Moreover, operators in the field may want to choose which object types need to be detected for a particular operation because indicating other object types may interfere with the operator being able to assess the operational situation. Thus, enabling this functionality on an unmanned vehicle or another device with limited computation resources is challenging at best.

SUMMARY

Therefore, methods and systems are described herein for generating composite images that include object identifiers determined based on processing those images through multiple machine learning models. For example, an Artificial Intelligence (AI) gateway system may be used to perform the operations described herein. In some embodiments, the AI gateway may reside on an unmanned vehicle (e.g., an unmanned aerial vehicle, an unmanned ground vehicle, an unmanned water vehicle, etc.). In some embodiments, the AI gateway may reside on a controller that an operator may use to control one or more unmanned vehicles. The AI gateway may receive a plurality of images corresponding to a video stream. In some embodiments, the AI gateway residing on the unmanned vehicle may receive the plurality of images (e.g., as a video stream) that are captured by a camera residing on the unmanned vehicle. In some embodiments, instead of or in addition to the plurality of images, the AI gateway may receive radio spectrum data, audio data, point cloud data, or other suitable data. Thus, instead of images, the AI gateway may process frames of data.

The AI gateway may determine a plurality of object types to be recognized in the plurality of images. For example, the plurality of object types to be recognized may be stored on the same device that is hosting the AI gateway. In some embodiments, the AI gateway may receive the object types from an operator (e.g., an operator at a controller). Thus, the AI gateway may receive, from the controller at the unmanned vehicle, a command to perform object recognition within the video stream. The command may include a plurality of indications of the plurality of object types. For example, the controller may include a graphical user interface where an operator may select from the available object types (e.g., based on machine learning models available on the unmanned vehicle and/or on the controller). The controller may receive the selection of one or more object types from the graphical user interface and, in some embodiments, transmit the selection(s) to the unmanned vehicle. The unmanned vehicle may receive the selection(s). Thus, the AI gateway may determine the plurality of object types based on the plurality of indications (e.g., based on the selections).

The AI gateway may determine, based on the plurality of object types, a plurality of machine learning models for processing the plurality of images. Each machine learning model may identify an object type different from object types identified by other machine learning models in the plurality of machine learning models. For example, the unmanned vehicle may have onboard three machine learning models for identifying objects within images. One machine learning model may identify land-based weapon systems (e.g., tanks, javelin missiles, and others). Another machine learning model may identify aerial weapon systems (e.g., airplanes, helicopters, etc.). And yet another machine learning model may identify human beings. In some embodiments, multiple machine learning models may identify the same object.

To continue with the example above, the unmanned vehicle may receive a selection of land-based weapon systems and aerial weapon systems to identify within the video stream. Thus, the AI gateway may enable two of the three machine learning models. That is, the AI gateway may feed the images from the video stream into the machine learning model that identifies land-based weapon systems and into the machine learning model that identifies aerial weapon systems. The AI gateway may refrain from feeding the images into the machine learning model that recognizes human beings. As a result, fewer system resources may be utilized on the unmanned vehicle, enabling the unmanned vehicle to function longer.

In some embodiments, the AI gateway may use the following operations to determine the plurality of machine learning models for processing the plurality of images. The AI gateway may retrieve, for each machine learning model available at an unmanned vehicle, one or more object types that each machine learning model has been trained to identify. For example, if five machine learning models are available at the unmanned vehicle, the AI gateway may retrieve object types that each machine learning model is trained to recognize.

The AI gateway may compare the plurality of object types with the one or more object types that each machine learning model has been trained to identify. For example, the AI gateway may compare the required object types with available object types and determine that only three of five machine learning models need to be active to perform the detection. Thus, the AI gateway may select, based on the comparing, only the required machine learning models for processing the plurality of images (e.g., the AI gateway may distribute the images to the required machine learning models only).

The AI gateway may sequentially input the plurality of images into each of the plurality of machine learning models to obtain a plurality of sets of objects from the plurality of machine learning models. Each machine learning model in the plurality of machine learning models may identify one or more object types of the plurality of object types in the plurality of images. Thus, the AI gateway may input the images into each machine learning model in chronological order one by one.

The different machine learning models may be generated by different entities. To continue with the example above, company A may generate the machine learning model for recognizing land-based objects, for example, because company A has a large amount of training data for those specific objects. Furthermore, company B may generate the machine learning model for recognizing aerial objects, for example, because company B has a large amount of training data for those specific objects. As a result, these machine learning models may take different amounts of time to process the same image. Thus, in some embodiments, one or more machine learning models may process images faster or slower than other machine learning models. The AI gateway may adjust machine learning model processing based on how fast machine learning models process images or, in some embodiments, audio or other data described above.

In particular, the AI gateway may input a first image into each of the plurality of machine learning models. For example, the AI gateway may input a first image into a first machine learning model and a second machine learning model. The AI gateway may receive output from the first machine learning model based on the first image. The output may include coordinates with the image of a particular object. The output may also include an identifier of the object (e.g., tank, javelin missile, etc.).

The AI gateway may then determine that a subset of images has been input into a second machine learning model of the plurality of machine learning models. For example, while the first machine learning model has been processing the first image, the second machine learning model may have processed three images because, for example, the second machine learning model is more time efficient with image processing. Thus, the AI gateway may input a last image of the subset of images into the first machine learning model while refraining from inputting other images of the subset of images into the first machine learning model. For example, if the second machine learning model has received input of three images, while the first machine learning model was processing the first image, the AI gateway may input only the third image into the first machine learning model and refrain from inputting the second image into the first machine learning model for more efficient processing.

The AI gateway may then receive from each machine learning model a plurality of indicators indicating in the plurality of images a plurality of objects identified in a corresponding image of the plurality of images. For example, the first machine learning model may output indicators and coordinates for one or more objects recognized in the video stream, while the second machine learning model may output indicators and coordinates for one or more other objects (having object types different from object types recognized by the first machine learning model). In some embodiments, particular images in the video stream may have no recognizable objects.

The AI gateway may then generate a set of composite images for the plurality of images with the plurality of indicators corresponding to the plurality of objects. For example, the AI gateway may retrieve each image of the video stream and overlay indicators of various objects recognized in that image. The indicators may be boxes, circles, or other shapes that indicate different objects. In some embodiments, the indicators may include the name of the object (e.g., tank, javelin missile, etc.).

In some embodiments, as discussed above, one or more machine learning models may not process every image because of the time required to process each image. In those embodiments, the AI gateway may perform the following operations to generate the composite images. The AI gateway may overlay, over the first image, a first indicator at a first set of coordinates and a second indicator at a second set of coordinates. The first set of coordinates may correspond to a first object detected by the first machine learning model and the second set of coordinates may correspond to a second object detected by the second machine learning model in the first image. To continue with the example above, the first machine learning model may be a machine learning model that is trained to recognize land-based objects (e.g., tanks, javelin missiles, etc.) and the second machine learning model may be a machine learning model that is trained to recognize aerial objects (e.g., airplanes, helicopters, etc.). Thus, if the first machine learning model detects a tank at particular coordinates within the image and the second machine learning model detects a helicopter at another set of coordinates within the image, the AI gateway may overlay indicators of those objects onto the first image.

The AI gateway may also overlay, over a second image, a third indicator at a third set of coordinates. The third set of coordinates may correspond to the second object detected by the second machine learning model in the second image. For example, the second image may have the helicopter move from one set of coordinates to another set of coordinates. Thus, the AI gateway may overlay an indicator for the helicopter at the new set of coordinates. In this case, the second image may not have been processed by the first machine learning model in view of timing discussed above. Thus, the AI gateway may determine that the first machine learning model did not process the second image and may not add any indicators based on detection by the first machine learning model.

The AI gateway may then generate an output video stream that includes the set of composite images to be displayed in chronological order. For example, the AI gateway may use the composite images to generate an updated video stream. In some embodiments, the AI gateway may transmit the output video stream from the unmanned vehicle to a controller. For example, if the AI gateway resides on the unmanned vehicle, the AI gateway may transmit the updated video stream to the controller. In some embodiments, if the AI gateway resides on the controller, the AI gateway may transmit the video stream to a remote location (e.g., where the video stream may be viewed by commanding officers).

As discussed above, the machine learning models from different entities may work differently and may consume/utilize resources differently. Thus, it may be necessary in some cases to throttle/shut down some of the machine learning models to enable the unmanned vehicle and/or controller to operate longer and/or more efficiently. Thus, the AI gateway may determine that resource utilization of a first machine learning model of the plurality of machine learning models meets a threshold. For example, one of the machine learning models may be using up more resources (e.g., processor, memory, power, etc.) than has been reserved for that machine learning model.

In response to determining that the resource utilization of the first machine learning model meets the threshold, the AI gateway may modify input of the plurality of images into the first machine learning model. For example, the AI gateway may throttle input of images into the machine learning model. That is, the AI gateway may input every third image or every fifth image into the machine learning model. In response to determining that after modifying the input of the plurality of images, the resource utilization of the first machine learning model still meets the threshold, the AI gateway may stop the input of images into the first machine learning model while continuing the input of images into other machine learning models.

Various other aspects, features, and advantages of the system will be apparent through the detailed description and the drawings attached hereto. It is also to be understood that both the foregoing general description and the following detailed description are examples, and not restrictive of the scope of the disclosure. As used in the specification and in the claims, the singular forms of "a," "an," and "the" include plural referents unless the context clearly dictates otherwise. In addition, as used in the specification and the claims, the term "or" means "and/or" unless the context clearly dictates otherwise. Additionally, as used in the specification, "a portion" refers to a part of, or the entirety of (i.e., the entire portion), a given item (e.g., data), unless the context clearly dictates otherwise.

BRIEF DESCRIPTION OF THE DRAWINGS

FIG. 5 illustrates an excerpt of a table that may store frame identifiers and machine learning model output for each frame, in accordance with one or more embodiments of this disclosure.

DETAILED DESCRIPTION OF THE DRAWINGS

In the following description, for the purposes of explanation, numerous specific details are set forth in order to provide a thorough understanding of the disclosed embodiments. It will be appreciated, however, by those having skill in the art, that the embodiments may be practiced without these specific details, or with an equivalent arrangement. In other cases, well-known models and devices are shown in block diagram form in order to avoid unnecessarily obscuring the disclosed embodiments. It should also be noted that the methods and systems disclosed herein are also suitable for applications unrelated to source code programming.

Figure 1:
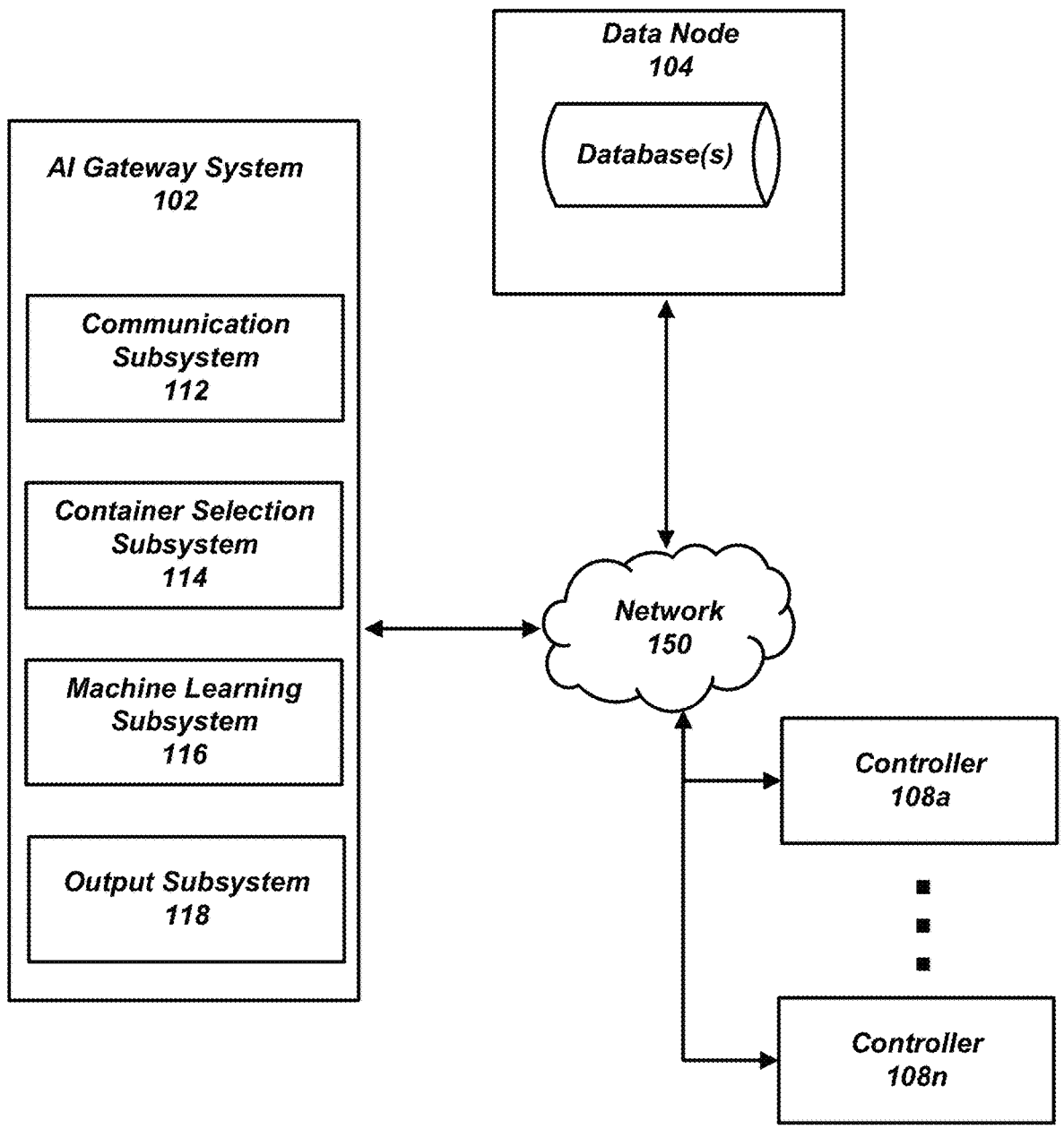
FIG. 1 shows an illustrative system for generating composite frames that include object identifiers determined based on multi-machine learning model processing, in accordance with one or more embodiments of this disclosure.

FIG. 1 is an example of environment 100 for generating composite frames that include object identifiers determined based on multi-machine learning model processing. Environment 100 includes AI gateway system 102, data node 104, and controllers 108a-108n. AI gateway system 102 may execute instructions generating composite frames that include object identifiers determined based on multi-machine learning model processing. AI gateway system 102 may include software, hardware, or a combination of the two. For example, AI gateway system 102 may reside on an unmanned vehicle. In some embodiments, although shown separately, AI gateway system 102 may reside on one or more controllers 108a-108n.

Data node 104 may store various data. For example, data node 104 may store a repository of machine learning models that may be loaded onto the AI gateway system (e.g., that is residing on an unmanned vehicle and/or one or more controllers 108a-108n). In some embodiments, data node 104 may also be used to train and/or tweak machine learning models. Data node 104 may include software, hardware, or a combination of the two. For example, data node 104 may be a physical server, or a virtual server that is running on a physical computer system. In some embodiments, data node 104 may reside in a datacenter to be used by commanding officers for situational awareness. Network 150 may be a local area network, a wide area network (e.g., the Internet), or a combination of the two. Controllers 108a-108n may be end-user computing devices (e.g., laptops, electronic tablets, smart phones, and/or other computing devices used by end users).

AI gateway system 102 may receive a plurality of frames from a recording device. AI gateway system 102 may receive the frames using communication subsystem 112. Communication subsystem 112 may include software components, hardware components, or a combination of both. For example, communication subsystem 112 may include a network card (e.g., a wireless network card/processor) that is coupled with software to drive the card/processor. The network card may be built into an unmanned vehicle. In some embodiments, communication subsystem 112 may receive the frames from a recording device onboard the unmanned vehicle. For example, the unmanned vehicle may include an onboard camera that may send images to communication subsystem 112 via a wired and/or wireless connection. The AI gateway system may receive, via communication subsystem 112, images from the onboard camera. Communication subsystem 112 may pass the frames, or a pointer to the frames in memory, to container selection subsystem 114.

Container selection subsystem 114 may store a plurality of containers such that each container stores a machine learning model. In some embodiments, there may be a one-to-one ratio between containers and machine learning models. However, in some embodiments, each container may be a client container and may be dedicated for storing machine learning models from a particular entity (e.g., from a particular company that creates machine learning models). Container selection subsystem 114 may include software components, hardware components, or a combination of both. In some embodiments, container selection subsystem 114 may determine a plurality of object types to be recognized in the plurality of frames. For example, container selection subsystem 114 may retrieve the object types to be recognized from memory.

In some embodiments, container selection subsystem 114 may determine the object types to be recognized based on data received from a controller (e.g., one or more controllers 108a-108n). Container selection subsystem 114 may receive, from a controller, a command to perform object recognition within the video stream. The command may include a plurality of indications of the plurality of object types. For example, an operator at a controller may select one or more object types to be recognized. That is, the controller may have a touch screen and a graphical user interface enabling the operator to select object types to be recognized (e.g., tanks, helicopters, javelin missiles, etc.). The object types may also be more general. For example, the operator may select land-based vehicles as object types and/or aerial vehicles as object types and/or water-based vehicles as object types. Thus, the container selection system may receive the selections via the controller. The container selection system may then decode the indications and determine, based on the indications, a plurality of object types to recognize.

Container selection subsystem 114 may then determine, based on the plurality of object types, a plurality of machine learning models for processing the plurality of frames. Each machine learning model may identify an object type different from object types identified by other machine learning models in the plurality of machine learning models. For example, container selection subsystem 114 may determine the plurality of machine learning models using the following operations. Container selection subsystem 114 may retrieve, for each machine learning model available (e.g., at the unmanned vehicle and/or the controller), one or more object types that each machine learning model has been trained to identify. For example, container selection subsystem 114 may store a table (or another suitable data structure) that includes indications of the available machine learning models and corresponding object types that each of those machine learning models is trained to recognize. Container selection subsystem 114 may retrieve those object types.

Container selection subsystem 114 may compare the plurality of object types with the one or more object types that each machine learning model has been trained to identify. For example, container selection subsystem 114 may determine that the required object types (e.g., as received from the controller) are people, land-based vehicles, and aerial vehicles. In some embodiments, the object types may be more specific (e.g., tanks, helicopters, airplanes, etc.). Thus, container selection subsystem 114 may determine which machine learning models have been trained to recognize those object types. For example, a first available machine learning model may have been trained to recognize aerial vehicles (e.g., including helicopters, airplanes, aerial drones, etc.). Thus, container selection subsystem 114 may select that first available machine learning model to receive frame data. To continue with this example, a second available machine learning model may have been trained to recognize land-based vehicles (e.g., including tanks, missile systems, etc.). Container selection subsystem 114 may select that second available machine learning model to receive frame data based on the received requirements. Thus, container selection subsystem 114 may select, based on the comparing, the plurality of machine learning models for processing the plurality of frames.

In some embodiments, container selection subsystem 114 may determine that not all object types that are required to be recognized can be recognized by the available machine learning models available (e.g., available at the unmanned vehicle and/or controller). Thus, container selection subsystem 114 may attempt to load (e.g., from data node 104) a machine learning model for a particular object type that is required. Container selection subsystem 114 may transmit (e.g., via communication subsystem 112) to a storage node (e.g., data node 104) a request for a machine learning model. The request may include one or more object types required to be recognized. In response, container selection subsystem 114 may receive (e.g., via communication subsystem 112) one or more machine learning models. In some embodiments, container selection subsystem 114 may receive metadata with each machine learning model. The metadata may indicate which object types the particular machine learning model has been trained to recognize.

In some embodiments, container selection subsystem 114 may indicate to an operator (e.g., at a controller) which objects the available machine learning models have been trained to recognize. Thus, container selection subsystem 114 may transmit to the controller device a list of object types available for recognition. The controller may receive an input from the operator selecting one or more object types to recognize. Container selection subsystem 114 may receive the selected object types from the operator and identify to which machine learning models received frames should be distributed. Container selection subsystem 114 may pass indicators of the required machine learning models to machine learning subsystem 116.

Machine learning subsystem 116 may receive the indicators of the required machine learning models. Machine learning subsystem 116 may include software components, hardware components, or a combination of both. For example, machine learning subsystem 116 may include software components that access data in memory and/or storage, and may use one or more processors to perform its operations. Machine learning subsystem 116 may sequentially input the plurality of frames into each of the plurality of machine learning models to obtain a plurality of sets of objects from the plurality of machine learning models. Each machine learning model in the plurality of machine learning models may identify one or more object types of the plurality of object types in the plurality of frames. In some embodiments, the sets of objects may include object identifiers and locations of the objects within each frame.

As discussed above, different machine learning models may be generated by different entities. For example, company A may build a machine learning model for recognizing land-based vehicles. Company A's machine learning model may be the best at recognizing land-based vehicles because company A has a large amount of training data for those specific land-based vehicles. Furthermore, company B may generate a machine learning model for recognizing aerial vehicles, for example, because company B has the best training data for those specific vehicles. As a result, these machine learning models may take different amounts of time to process the same image. Thus, in some embodiments, one or more machine learning models may process images faster or slower than other machine learning models. The AI gateway may adjust machine learning model processing based on how fast machine learning models process frames (e.g., image frames, audio frames, point cloud frames, etc.).

Machine learning subsystem 116 may input a first frame into each of the plurality of machine learning models. In some embodiments, machine learning subsystem 116 may input the first frame (e.g., image frame, audio frame, point cloud frame) into other machine learning models that have been determined to be required based on object types that need to be recognized.

Machine learning subsystem 116 may receive output from a first machine learning model of the plurality of machine learning models. As discussed above, the output may be one or more sets of coordinates within a frame (e.g., video frame) indicating where a particular land-based vehicle is located within that frame. In some embodiments, machine learning subsystem 116 may output an indication of the object type (or a sub-type of the object) that was recognized at the particular coordinates.

Machine learning subsystem 116 may determine that a subset of frames of the plurality of frames has been input into a second machine learning model of the plurality of machine learning models. The subset of frames may include multiple frames (e.g., two frames, three frames, four frames, etc.). For example, machine learning subsystem 116 may perform frame-by-frame input into each machine learning model. That is, machine learning subsystem 116 may input the first frame into a particular machine learning model and wait until the machine learning model outputs any object recognition data for that frame. When the object recognition data is output, machine learning subsystem 116 may store a data structure with the output of the machine learning model and may link the output with the associated frame (e.g., via a pointer). The data structure may include one or more indications (e.g., sets of coordinates) and an identifier of the recognized object. Machine learning subsystem 116 may then input the next frame into the machine learning model and wait for output. Machine learning subsystem 116 may perform the same process for each machine learning model that was needed to recognize the required objects. Thus, machine learning subsystem 116 may run parallel processes for the machine learning models. As a result, some machine learning models may consume frames (e.g., video frames, audio frames, point cloud frames, etc.) at a faster rate than other machine learning models.

Figure 2:
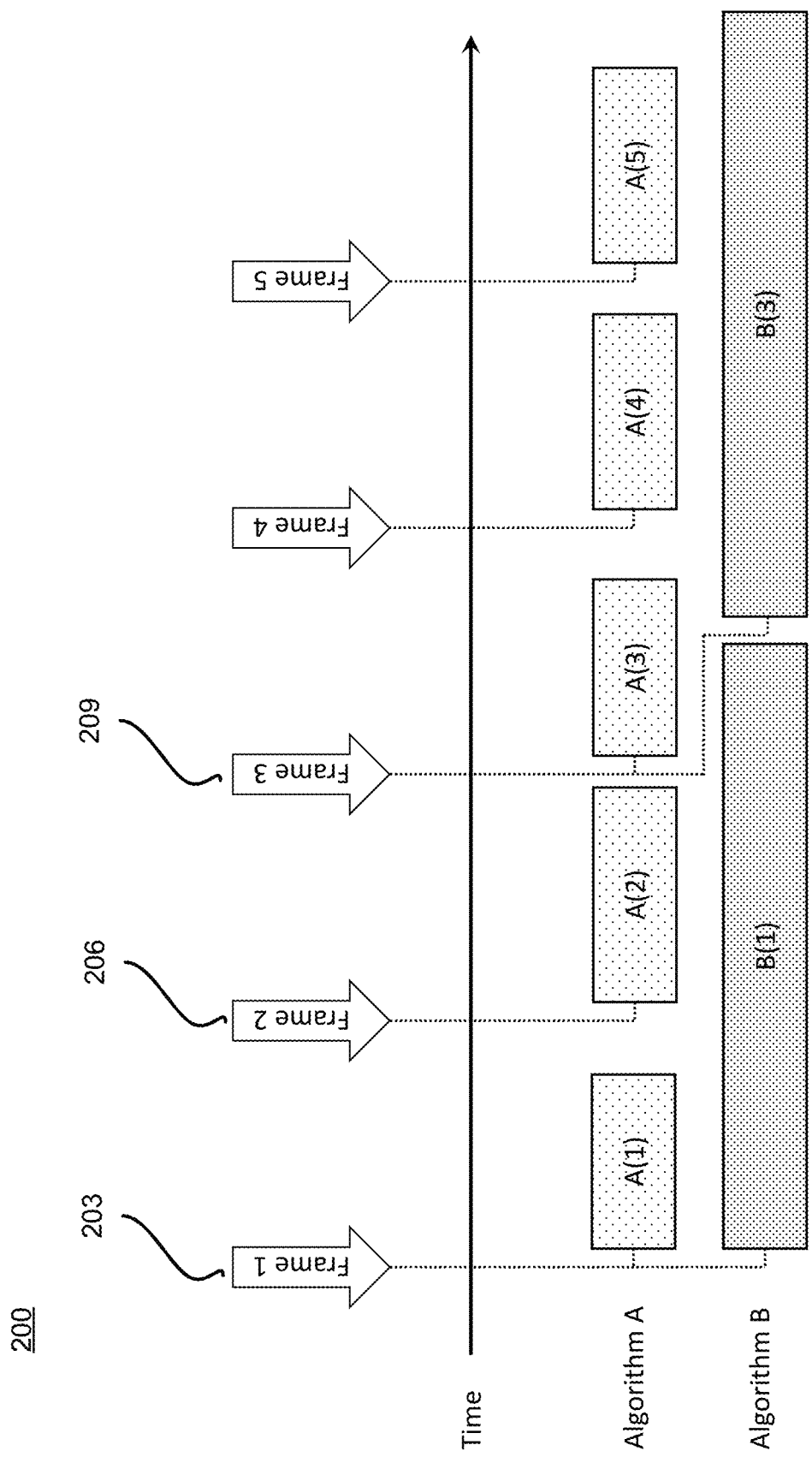
FIG. 2 illustrates how frames may be distributed to two machine learning models, in accordance with one or more embodiments of this disclosure.

To speed up processing of the frames, machine learning subsystem 116 may skip some frames when one or more machine learning models perform operations slower. Thus, machine learning subsystem 116 may input a last frame of the subset of frames into the first machine learning model while refraining from inputting other frames of the subset of frames into the first machine learning model. FIG. 2 is a diagram 200 that illustrates how frames may be distributed to two machine learning models, in accordance with one or more embodiments of this disclosure. Frame 203 may be the first frame of the plurality of frames to be distributed to two algorithms (algorithm A and algorithm B). Each algorithm may correspond to a machine learning model as described above. Thus, when algorithm A (e.g., machine learning model A) processes frame 203, algorithm A may send the recognized objects to machine learning subsystem 116. When algorithm A finishes with frame 203, algorithm B may not be finished processing that frame. Thus, machine learning subsystem 116 may distribute frame 206 to algorithm A. When algorithm A is finished processing frame 206, machine learning subsystem 116 may distribute frame 209 to algorithm A. Algorithm B may then send the results of processing frame 203 (e.g., coordinates of objects and objects recognized in frame 203). Machine learning subsystem 116 may determine that algorithm A received frame 209. Thus, machine learning subsystem 116 may distribute frame 209 to algorithm B, skipping frame 206.

Machine learning subsystem 116 may receive from each machine learning model a plurality of indicators indicating in the plurality of frames a plurality of objects identified in a corresponding frame of the plurality of frames. As described above, machine learning subsystem 116 may receive, for each frame, from each machine learning model, objects recognized by each machine learning model. However, some frames may not have any objects recognized, so those frames would not have associated objects. Thus, machine learning subsystem 116 may store a data structure for each frame and add to that data structure locations within the frame of each object and indication of object type. Machine learning subsystem 116 may add frames and object data to the data structure as frames are processed by machine learning models. Machine learning subsystem 116 may then pass the object data and the frames to output subsystem 118.

Figure 3:
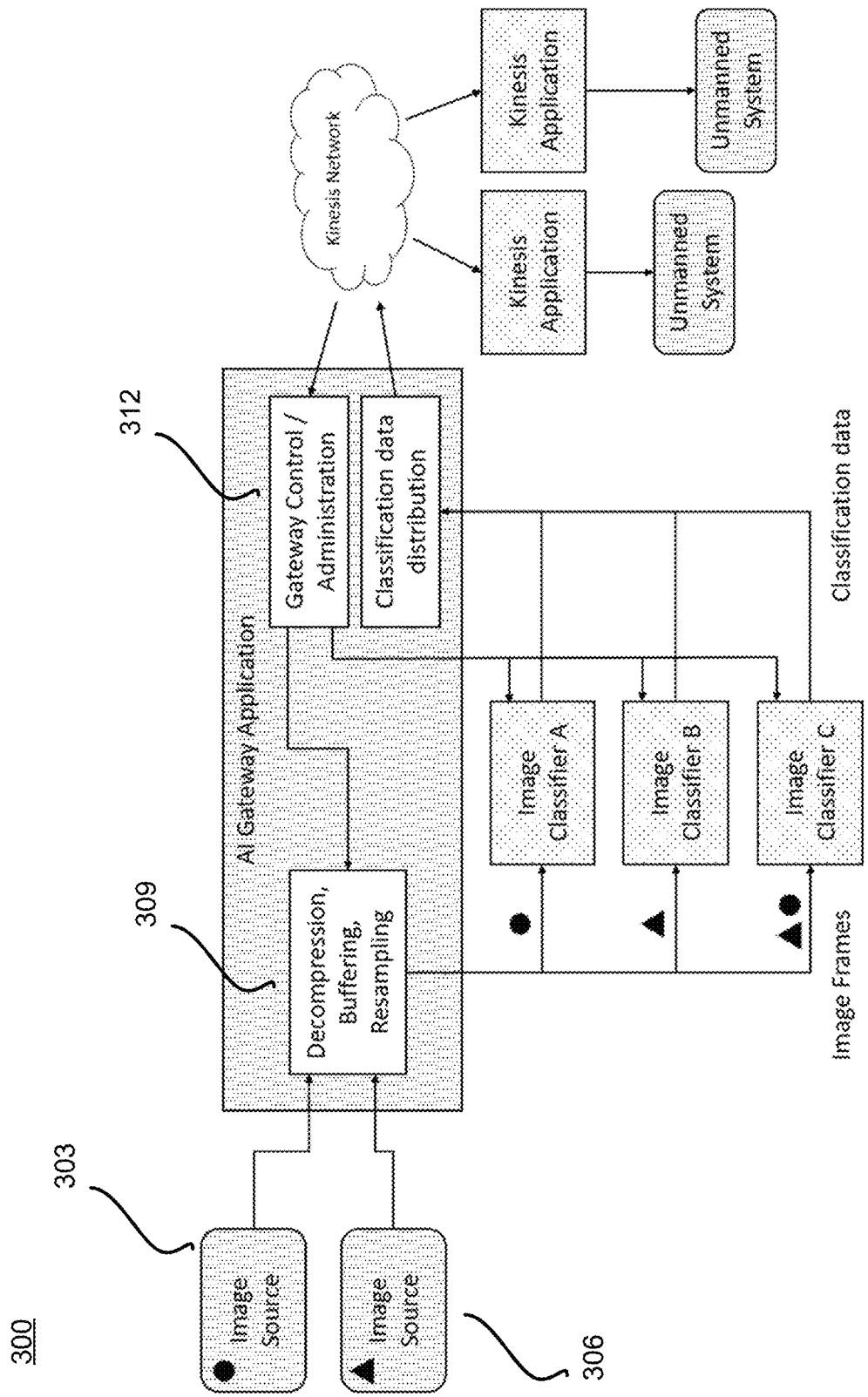
FIG. 3 shows an illustrative system for generating composite images that include object identifiers determined based on multi-machine learning model processing multiple image sources, in accordance with one or more embodiments of this disclosure.

In some embodiments, machine learning subsystem 116 may process images from multiple sources. FIG. 3 illustrates system 300 for generating composite images that include object identifiers determined based on multi-machine learning model processing multiple image sources. System 300 illustrates two image sources: image source 303 and image source 306. The images from the image sources are passed to pre-processing system 309, which may perform decompression, buffering, and or resampling operations. Machine learning subsystem 116 may determine that image classifier A (e.g., a particular machine learning model) should have frames distributed from image source 303, while image classifier B (e.g., another machine learning model) should have frames distributed from image source 306. Furthermore, machine learning subsystem 116 may determine that image classifier C (e.g., yet another machine learning model) should have frames distributed from both image source 303 and image source 306. In some embodiments, machine learning subsystem 116 may reside at gateway control/administration container 312. Image classifiers A, B, and C may process the images in any ways discussed above (e.g., sequentially) and distribute the classification data as described above.

Figure 4:
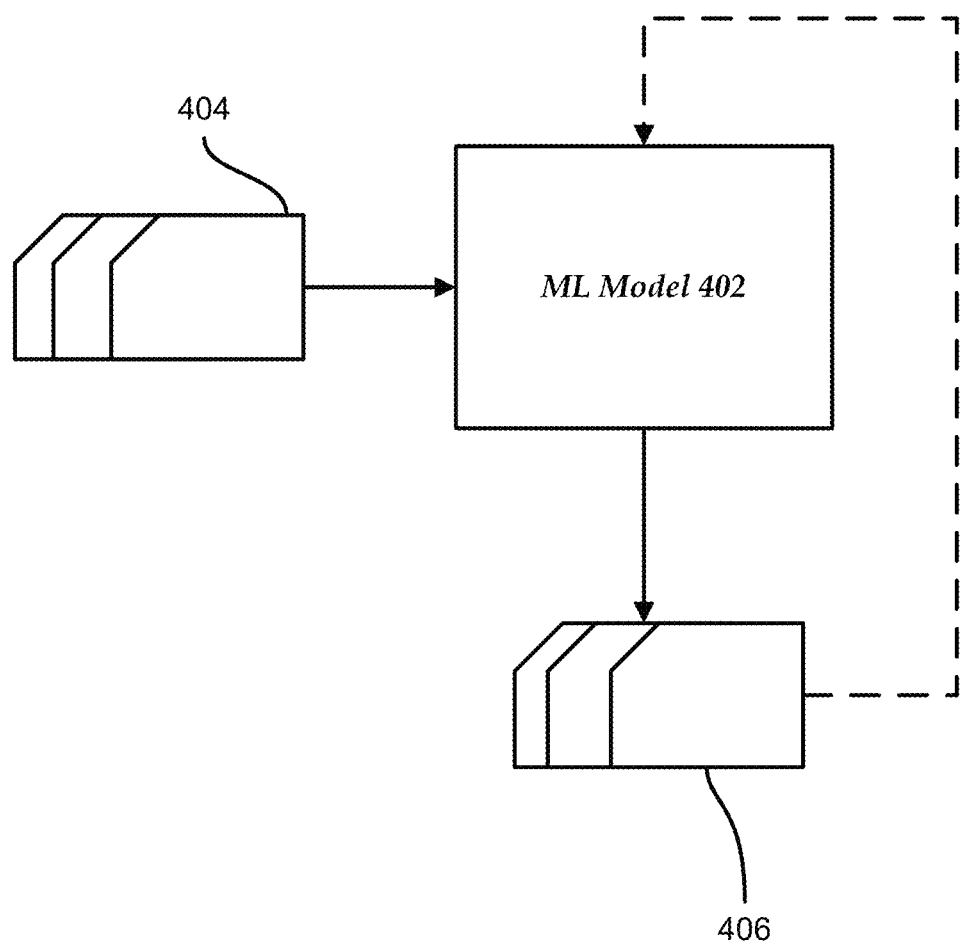
FIG. 4 illustrates an exemplary machine learning model, in accordance with one or more embodiments of this disclosure.

The machine learning models and algorithms described above may take many forms. However, these machine learning models and/or algorithms may be used by machine learning subsystem 116 with any application programming interface. FIG. 4 illustrates an exemplary machine learning model. Machine learning model 402 may take input 404 (e.g., frame data, image data, sound data, point cloud data) and may produce output 406 that includes coordinates and object types (e.g., object identifiers) or other suitable outputs. The output parameters may be fed back to the machine learning model as input to train the machine learning model (e.g., alone or in conjunction with user indications of the accuracy of outputs, labels associated with the inputs, or other reference feedback information). The machine learning model may update its configurations (e.g., weights, biases, or other parameters) based on the assessment of its prediction (e.g., of an information source) and reference feedback information (e.g., user indication of accuracy, reference labels, or other information). Connection weights may be adjusted, for example, if the machine learning model is a neural network, to reconcile differences between the neural network's prediction and the reference feedback. One or more neurons of the neural network may require that their respective errors are sent backward through the neural network to facilitate the update process (e.g., backpropagation of error). Updates to the connection weights may, for example, be reflective of the magnitude of error propagated backward after a forward pass has been completed. In this way, for example, the machine learning model may be trained to generate better predictions of information sources that are responsive to a query.

In some embodiments, the machine learning model may include an artificial neural network. In such embodiments, the machine learning model may include an input layer and one or more hidden layers. Each neural unit of the machine learning model may be connected to one or more other neural units of the machine learning model. Such connections may be enforcing or inhibitory in their effect on the activation state of connected neural units. Each individual neural unit may have a summation function, which combines the values of all of its inputs together. Each connection (or the neural unit itself) may have a threshold function that a signal must surpass before it propagates to other neural units. The machine learning model may be self-learning and/or trained, rather than explicitly programmed, and may perform significantly better in certain areas of problem solving, as compared to computer programs that do not use machine learning. During training, an output layer of the machine learning model may correspond to a classification of machine learning model, and an input known to correspond to that classification may be input into an input layer of the machine learning model during training. During testing, an input without a known classification may be input into the input layer, and a determined classification may be output.

A machine learning model may include embedding layers in which each feature of a vector is converted into a dense vector representation. These dense vector representations for each feature may be pooled at one or more subsequent layers to convert the set of embedding vectors into a single vector.

The machine learning model may be structured as a factorization machine model. The machine learning model may be a non-linear model and/or supervised learning model that can perform classification and/or regression. For example, the machine learning model may be a general-purpose supervised learning algorithm that the system uses for both classification and regression tasks. Alternatively, the machine learning model may include a Bayesian model configured to perform variational inference on the graph and/or vector.

Output subsystem 118 may receive the frames and the data generated by the machine learning models and may generate a set of composite frames for the plurality of frames with the plurality of indicators corresponding to the plurality of objects. For example, output subsystem 118 may access the frames in memory and the data structure for each frame that includes object types and coordinate information. Output subsystem 118 may retrieve the frame and determine a point within the frame corresponding to the coordinates. Output subsystem 118 may then determine an object type recognized and those coordinates and overlay onto the frame an indicator of the object type (e.g., output subsystem 118 may add an indicator of a tank at particular coordinates).

FIG. 5 illustrates an excerpt of table 500 that may store frame identifiers and machine learning model output for each frame. Column 503 may store frame identifiers, while column 506 may store output of a first machine learning model for a corresponding frame. Column 509 may store output of a second machine learning model for each frame. Thus, when output subsystem 118 generates composite frames, output subsystem 118 may access the table of FIG. 5 and cycle through each frame to overlay the output from each machine learning model.

In some embodiments, some frames may not have been processed by one or more particular machine learning models. Thus, output subsystem 118 may overlay, over the first frame, a first indicator at a first set of coordinates and a second indicator at a second set of coordinates. The first set of coordinates may correspond to a first object detected by the first machine learning model and the second set of coordinates may correspond to a second object detected by the second machine learning model in the first frame. However, output subsystem 118 may overlay, over a second frame, only a third indicator at a third set of coordinates. The third set of coordinates may correspond to the second object detected by the second machine learning model in the second frame. That is, output subsystem 118 may determine that the first machine learning model did not process the second frame. Thus, output subsystem 118 may not overlay any data from the first machine learning model onto the second frame. Output subsystem 118 may then generate an output stream that includes the set of composite frames to be played back in chronological order.

In some embodiments, at least a portion of the AI gateway system may reside on an unmanned vehicle. Thus, the AI gateway system may transmit the output stream from the unmanned vehicle to a controller. The AI gateway system may transmit the output stream using communication subsystem 112 via network 150.

In some embodiments, machine learning subsystem 116 may need to throttle/shut down some machine learning models to enable the unmanned vehicle and/or controller to operate longer and/or more efficiently. Thus, machine learning subsystem 116 may monitor, on an unmanned vehicle (or on a controller), resource utilization of each of the plurality of machine learning models. For example, machine learning subsystem 116 may use one or more software/hardware packages to monitor process utilization, memory utilization, power utilization (e.g., battery consumption), heat generation, etc. Machine learning subsystem 116 may determine that resource utilization of a first machine learning model of the plurality of machine learning models meets a threshold. For example, the software/hardware package(s) used to monitor resources may have one or more built-in thresholds for each machine learning model (e.g., 10% process utilization and/or 5% memory utilization, etc.). If one or more of those thresholds are met, machine learning subsystem 116 may determine that, for a particular machine learning model, the threshold has been met.

In response to determining that the resource utilization of the first machine learning model of the plurality of machine learning models meets the threshold, machine learning subsystem 116 may modify input of the plurality of frames into the first machine learning model. For example, machine learning subsystem 116 may throttle frame distribution to the particular machine learning model (e.g., input every fifth frame into the machine learning model).

In response to determining that after modifying the input of the plurality of frames, the resource utilization of the first machine learning model still meets the threshold, machine learning subsystem 116 may stop the input of the plurality of frames into the first machine learning model while continuing the input of the plurality of frames into all other machine learning models of the plurality of machine learning models.

Computing Environment

Figure 6:
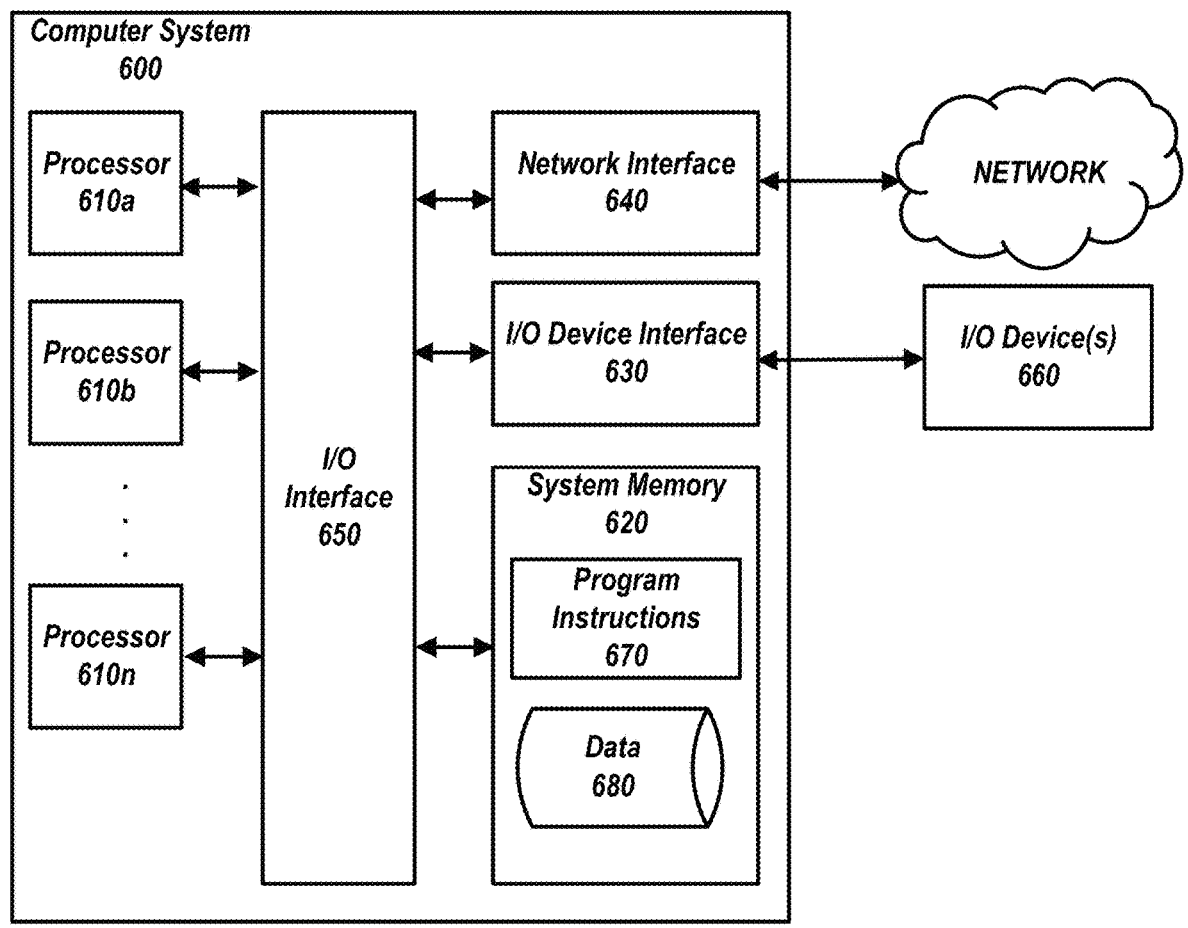
FIG. 6 illustrates a computing device, in accordance with one or more embodiments of this disclosure.

FIG. 6 shows an example computing system that may be used in accordance with some embodiments of this disclosure. In some instances, computing system 600 is referred to as a computer system. The computing system may be hosted on an unmanned vehicle, a controller, or another suitable device. A person skilled in the art would understand that those terms may be used interchangeably. The components of FIG. 6 may be used to perform some or all operations discussed in relation to FIGS. 1-5. Furthermore, various portions of the systems and methods described herein may include or be executed on one or more computer systems similar to computing system 600. Further, processes and modules described herein may be executed by one or more processing systems similar to that of computing system 600.

Computing system 600 may include one or more processors (e.g., processors 610a-610n) coupled to system memory

620, an input/output (I/O) device interface 630, and a network interface 640 via an I/O interface 650. A processor may include a single processor, or a plurality of processors (e.g., distributed processors). A processor may be any suitable processor capable of executing or otherwise performing instructions. A processor may include a central processing unit (CPU) that carries out program instructions to perform the arithmetical, logical, and input/output operations of computing system 600. A processor may execute code (e.g., processor firmware, a protocol stack, a database management system, an operating system, or a combination thereof) that creates an execution environment for program instructions. A processor may include a programmable processor. A processor may include general or special purpose microprocessors. A processor may receive instructions and data from a memory (e.g., system memory 620). Computing system 600 may be a uni-processor system including one processor (e.g., processor 610$a$), or a multi-processor system including any number of suitable processors (e.g., 610$a$-610$n$). Multiple processors may be employed to provide for parallel or sequential execution of one or more portions of the techniques described herein. Processes, such as logic flows, described herein may be performed by one or more programmable processors executing one or more computer programs to perform functions by operating on input data and generating corresponding output. Processes described herein may be performed by, and apparatus can also be implemented as, special purpose logic circuitry, e.g., an FPGA (field-programmable gate array) or an ASIC (application-specific integrated circuit). Computing system 600 may include a plurality of computing devices (e.g., distributed computer systems) to implement various processing functions.

I/O device interface 630 may provide an interface for connection of one or more I/O devices 660 to computer system 600. I/O devices 660 may include devices that receive input (e.g., from a user) or output information (e.g., to a user). I/O devices 660 may include, for example, a graphical user interface presented on displays (e.g., a cathode ray tube (CRT) or liquid crystal display (LCD) monitor), pointing devices (e.g., a computer mouse or trackball), keyboards, keypads, touchpads, scanning devices, voice recognition devices, gesture recognition devices, printers, audio speakers, microphones, cameras, or the like. I/O devices 660 may be connected to computer system 600 through a wired or wireless connection. I/O devices 660 may be connected to computer system 600 from a remote location. I/O devices 660 located on remote computer systems, for example, may be connected to computer system 600 via a network and network interface 640.

Network interface 640 may include a network adapter that provides for connection of computer system 600 to a network. Network interface 640 may facilitate data exchange between computer system 600 and other devices connected to the network. Network interface 640 may support wired or wireless communication. The network may include an electronic communication network, such as the Internet, a local area network (LAN), a wide area network (WAN), a cellular communications network, or the like.

System memory 620 may be configured to store program instructions 670 or data 680. Program instructions 670 may be executable by a processor (e.g., one or more of processors 610$a$-610$n$) to implement one or more embodiments of the present techniques. Program instructions 670 may include modules of computer program instructions for implementing one or more techniques described herein with regard to various processing modules. Program instructions may include a computer program (which in certain forms is known as a program, software, software application, script, or code). A computer program may be written in a programming language, including compiled or interpreted languages, or declarative or procedural languages. A computer program may include a unit suitable for use in a computing environment, including as a stand-alone program, a module, a component, or a subroutine. A computer program may or may not correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program may be deployed to be executed on one or more computer processors located locally at one site, or distributed across multiple remote sites and interconnected by a communication network.

System memory 620 may include a tangible program carrier having program instructions stored thereon. A tangible program carrier may include a non-transitory computer-readable storage medium. A non-transitory computer-readable storage medium may include a machine readable storage device, a machine-readable storage substrate, a memory device, or any combination thereof. A non-transitory computer-readable storage medium may include non-volatile memory (e.g., flash memory, ROM, PROM, EPROM, EEPROM memory), volatile memory (e.g., random access memory (RAM), static random access memory (SRAM), synchronous dynamic RAM (SDRAM)), bulk storage memory (e.g., CD-ROM and/or DVD-ROM, hard drives), or the like. System memory 620 may include a non-transitory computer-readable storage medium that may have program instructions stored thereon that are executable by a computer processor (e.g., one or more of processors 610$a$-610$n$) to cause the subject matter and the functional operations described herein. A memory (e.g., system memory 620) may include a single memory device and/or a plurality of memory devices (e.g., distributed memory devices).

I/O interface 650 may be configured to coordinate I/O traffic between processors 610$a$-610$n$, system memory 620, network interface 640, I/O devices 660, and/or other peripheral devices. I/O interface 650 may perform protocol, timing, or other data transformations to convert data signals from one component (e.g., system memory 620) into a format suitable for use by another component (e.g., processors 610$a$-610$n$). I/O interface 650 may include support for devices attached through various types of peripheral buses, such as a variant of the Peripheral Component Interconnect (PCI) bus standard or the Universal Serial Bus (USB) standard.

Embodiments of the techniques described herein may be implemented using a single instance of computer system 600, or multiple computer systems 600 configured to host different portions or instances of embodiments. Multiple computer systems 600 may provide for parallel or sequential processing/execution of one or more portions of the techniques described herein.

Those skilled in the art will appreciate that computer system 600 is merely illustrative, and is not intended to limit the scope of the techniques described herein. Computer system 600 may include any combination of devices or software that may perform or otherwise provide for the performance of the techniques described herein. For example, computer system 600 may include or be a combination of a cloud-computing system, a data center, a server rack, a server, a virtual server, a desktop computer, a laptop computer, a tablet computer, a server device, a client device, a mobile telephone, a personal digital assistant (PDA), a mobile audio or video player, a game console, a vehicle-mounted computer, a Global Positioning System (GPS) receiver, or the like. Computer system 600 may also be connected to other devices that are not illustrated or may operate as a stand-alone system. In addition, the functionality provided by the illustrated components may, in some embodiments, be combined in fewer components, or distributed in additional components. Similarly, in some embodiments, the functionality of some of the illustrated components may not be provided, or other additional functionality may be available.

Operation Flow

Figure 7:
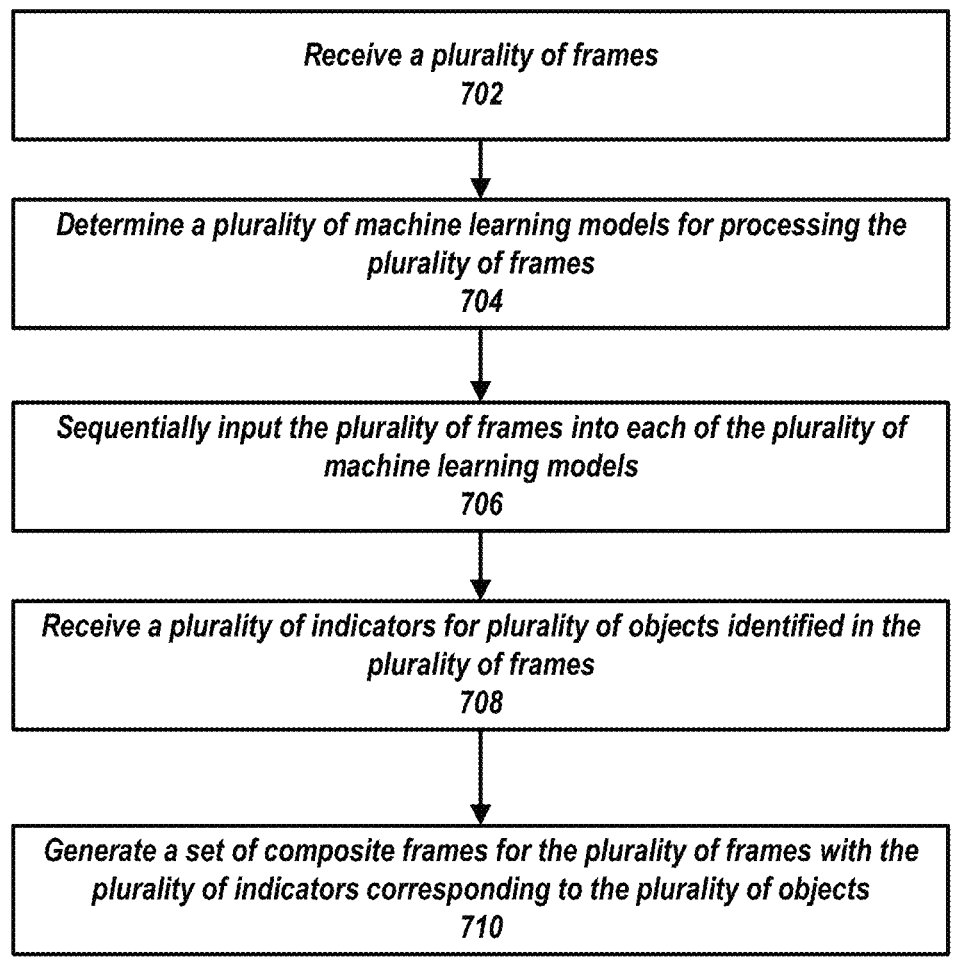
FIG. 7 is a flowchart of operations for generating composite frames that include object identifiers determined based on multi-machine learning model processing, in accordance with one or more embodiments of this disclosure.

FIG. 7 is a flowchart 700 of operations for generating composite frames that include object identifiers determined based on multi-machine learning model processing. The operations of FIG. 7 may use components described in relation to FIG. 6. In some embodiments, AI gateway system 102 may include one or more components of computing system 600. At 702, AI gateway system 102 receives a plurality of frames. For example, the AI gateway system may receive the frames from a camera on an unmanned vehicle. AI gateway system 102 may receive the frames over network 150 using network interface 640 or through a bus shared between the camera and the AI gateway system 102.

At 704, AI gateway system 102 determines a plurality of machine learning models for processing the plurality of frames. For example, AI gateway system 102 may perform operations described above to make the determination. AI gateway system 102 may use one or more processors 610a, 610b, and/or 610n to perform the determination. At 706, AI gateway system 102 sequentially inputs the plurality of frames into each of the plurality of machine learning models. For example, AI gateway system 102 may use one or more processors 610a-610n to perform the determination.

At 708, AI gateway system 102 receives a plurality of indicators for a plurality of objects identified in the plurality of frames. AI gateway system 102 may receive the plurality of indicators from a plurality of machine learning models. At 710, AI gateway system 102 generates a set of composite frames for the plurality of frames with the plurality of indicators corresponding to the plurality of objects. AI gateway system 102 may use one or more processors 610a, 610b, and/or 610n to perform the generation.

Although the present invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the scope of the appended claims. For example, it is to be understood that the present invention contemplates that, to the extent possible, one or more features of any embodiment can be combined with one or more features of any other embodiment.

The above-described embodiments of the present disclosure are presented for purposes of illustration, and not of limitation, and the present disclosure is limited only by the claims which follow. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

The present techniques will be better understood with reference to the following enumerated embodiments:

1. A method comprising: receiving a plurality of frames from a recording device; determining a plurality of object types to be recognized in the plurality of frames; determining, based on the plurality of object types, a plurality of machine learning models for processing the plurality of frames, wherein each machine learning model identifies an object type different from object types identified by other machine learning models in the plurality of machine learning models; sequentially inputting the plurality of frames into each of the plurality of machine learning models to obtain a plurality of sets of objects from the plurality of machine learning models, wherein each machine learning model in the plurality of machine learning models identifies one or more object types of the plurality of object types in the plurality of frames; receiving from each machine learning model a plurality of indicators indicating in the plurality of frames a plurality of objects identified in a corresponding frame of the plurality of frames; generating a set of composite frames for the plurality of frames with the plurality of indicators corresponding to the plurality of objects; and generating an output stream comprising the set of composite frames to be played back in chronological order.

2. Any of the preceding embodiments, wherein receiving the plurality of frames comprises capturing, at an unmanned vehicle, a plurality of images corresponding to a video stream.

3. Any of the preceding embodiments, further comprising transmitting the output stream from the unmanned vehicle to a controller.

4. Any of the preceding embodiments, wherein sequentially inputting the plurality of frames into each of the plurality of machine learning models to obtain the plurality of sets of objects from the plurality of machine learning models comprises: inputting a first frame into each of the plurality of machine learning models; receiving output from a first machine learning model of the plurality of machine learning models; determining that a subset of frames of the plurality of frames has been input into a second machine learning model of the plurality of machine learning models, wherein the subset of frames comprises multiple frames; and inputting a last frame of the subset of frames into the first machine learning model while refraining from inputting other frames of the subset of frames into the first machine learning model.

5. Any of the preceding embodiments, wherein generating the set of composite frames of the plurality of frames with the plurality of indicators comprises: overlaying, over the first frame, a first indicator at a first set of coordinates and a second indicator at a second set of coordinates, wherein the first set of coordinates corresponds to a first object detected by the first machine learning model and the second set of coordinates corresponds to a second object detected by the second machine learning model in the first frame; overlaying, over a second frame, a third indicator at a third set of coordinates, wherein the third set of coordinates corresponds to the second object detected by the second machine learning model in the second frame; and determining that the first machine learning model did not process the second frame.

6. Any of the preceding embodiments, wherein determining the plurality of object types to be recognized in the plurality of frames comprises: receiving, from a controller at an unmanned vehicle, a command to perform object recognition within the video stream, wherein the command comprises a plurality of indications of the plurality of object types; and determining the plurality of object types based on the plurality of indications.

7. Any of the preceding embodiments, wherein determining the plurality of machine learning models for processing the plurality of frames further comprises: retrieving, for each machine learning model available at an unmanned vehicle, one or more object types that each machine learning model has been trained to identify; comparing the plurality of object types with the one or more object types that each machine learning model has been trained to identify; and selecting, based on the comparing, the plurality of machine learning models for processing the plurality of frames.

8. Any of the preceding embodiments, further comprising: monitoring, on an unmanned vehicle, resource utilization of each of the plurality of machine learning models; determining that resource utilization of a first machine learning model of the plurality of machine learning models meets a threshold; in response to determining that the resource utilization of the first machine learning model of the plurality of machine learning models meets the threshold, modifying input of the plurality of frames into the first machine learning model; and in response to determining that after modifying the input of the plurality of frames, the resource utilization of the first machine learning model still meets the threshold, stopping the input of the plurality of frames into the first machine learning model while continuing the input of the plurality of frames into all other machine learning models of the plurality of machine learning models.

9. A tangible, non-transitory, machine-readable storage medium storing instructions that, when executed by a data processing apparatus, cause the data processing apparatus to perform operations comprising those of any of embodiments 1-8.

10. A system comprising: one or more processors; and memory storing instructions that, when executed by the processors, cause the processors to effectuate operations comprising those of any of embodiments 1-8.

11. A system comprising means for performing any of embodiments 1-8.

12. A system comprising cloud-based circuitry for performing any of embodiments 1-8.

What is claimed is:

1. A system for generating composite images that include object identifiers determined based on processing source images through multiple machine learning models, the system comprising:
one or more processors; and
a non-transitory computer-readable storage medium storing instructions, which when executed by the one or more processors cause the one or more processors to perform operations comprising:
receiving a plurality of images from a recording device;
accessing a plurality of machine learning models for processing the plurality of images;
inputting a first image into each of the plurality of machine learning models;
receiving output from a first machine learning model of the plurality of machine learning models;
determining that a subset of images of the plurality of images has been input into a second machine learning model of the plurality of machine learning models;
inputting a last image of the subset of images into the first machine learning model while refraining from inputting other images of the subset of images into the first machine learning model;
receiving from each machine learning model one or more indicators indicating one or more objects identified in corresponding images of the plurality of images;
generating a set of composite images for the plurality of images with the one or more indicators from each machine learning model; and
generating an output video stream comprising the set of composite images to be displayed in chronological order.

2. The system of claim 1, wherein the instructions further cause the one or more processors to perform operations comprising capturing, at an unmanned vehicle, the plurality of images corresponding to a video stream.

3. The system of claim 1, wherein the instructions for generating the set of composite images, when executed by the one or more processors, further cause the one or more processors to perform operations comprising:
overlaying, over the first image, a first indicator at a first set of coordinates and a second indicator at a second set of coordinates, wherein the first set of coordinates corresponds to a first object detected by the first machine learning model and the second set of coordinates corresponds to a second object detected by the second machine learning model in the first image;
overlaying, over a second image, a third indicator at a third set of coordinates, wherein the third set of coordinates corresponds to the second object detected by the second machine learning model in the second image; and
determining that the first machine learning model did not process the second image.

4. The system of claim 1, wherein the instructions further cause the one or more processors to determine a plurality of object types to be recognized in the plurality of images by:
receiving, from a controller at an unmanned vehicle, a command to perform object recognition within a video stream, wherein the command comprises a plurality of indications of the plurality of object types; and
determining the plurality of object types based on the plurality of indications.

5. A method comprising:
receiving a plurality of images from a recording device;
accessing a plurality of machine learning models for processing the plurality of images;
inputting the plurality of images into each of the plurality of machine learning models to obtain a plurality of sets of objects from the plurality of machine learning models;
receiving from each machine learning model one or more indicators indicating, in the plurality of images, one or more objects identified in a corresponding image of the plurality of images;
generating a set of composite images for the plurality of images with the one or more indicators from each machine learning model; and generating an output video stream comprising the set of composite images to be played back in chronological order.

6. The method of claim 5, wherein receiving the plurality of images comprises capturing, at an unmanned vehicle, a plurality of frames corresponding to a video stream.

7. The method of claim 6, further comprising transmitting the output video stream from the unmanned vehicle to a controller.

8. The method of claim 5, wherein inputting the plurality of images into each of the plurality of machine learning models to obtain the plurality of sets of objects from the plurality of machine learning models comprises inputting the plurality of images into a first machine learning model and into a second machine learning model.

9. The method of claim 8, wherein generating the set of composite images with the one or more indicators comprises:
  overlaying, over a first frame, a first indicator at a first set of coordinates and a second indicator at a second set of coordinates, wherein the first set of coordinates corresponds to a first object detected by the first machine learning model and the second set of coordinates corresponds to a second object detected by the second machine learning model in the first frame;
  overlaying, over a second frame, a third indicator at a third set of coordinates, wherein the third set of coordinates corresponds to the second object detected by the second machine learning model in the second frame; and
  determining that the first machine learning model did not process the second frame.

10. The method of claim 5, further comprising determining a plurality of object types to be recognized in the plurality of images by:
  receiving, from a controller at an unmanned vehicle, a command to perform object recognition, wherein the command comprises a plurality of indications of the plurality of object types; and
  determining the plurality of object types based on the plurality of indications.

11. The method of claim 5, further comprising:
  retrieving, for each machine learning model available at an unmanned vehicle, one or more object types that each machine learning model has been trained to identify; and
  selecting, based on comparing a plurality of object types with the one or more object types that each machine learning model has been trained to identify, the plurality of machine learning models for processing the plurality of images.

12. The method of claim 5, further comprising:
  monitoring, on an unmanned vehicle, resource utilization of each of the plurality of machine learning models;
  determining that the resource utilization of a first machine learning model of the plurality of machine learning models meets a threshold;
  in response to determining that the resource utilization of the first machine learning model of the plurality of machine learning models meets the threshold, modifying input of the plurality of images into the first machine learning model; and
  in response to determining that after modifying the input of the plurality of images, the resource utilization of the first machine learning model still meets the threshold, stopping the input of the plurality of images into the first machine learning model while continuing the input of the plurality of images into all other machine learning models of the plurality of machine learning models.

13. A non-transitory, computer-readable storage medium comprising instructions that when executed by one or more processors, cause the one or more processors to perform operations comprising:
  receiving a plurality of images from a recording device;
  accessing a plurality of machine learning models for processing the plurality of images;
  inputting the plurality of images into each of the plurality of machine learning models to obtain a plurality of sets of objects from the plurality of machine learning models;
  receiving from each machine learning model one or more indicators indicating, in the plurality of images, one or more objects identified in a corresponding image of the plurality of images;
  overlaying, over a first image, a first indicator at a first set of coordinates and a second indicator at a second set of coordinates, wherein the first set of coordinates corresponds to a first object detected by a first machine learning model and the second set of coordinates corresponds to a second object detected by a second machine learning model;
  overlaying, over a second image, a third indicator at a third set of coordinates, wherein the third set of coordinates corresponds to the second object detected by the second machine learning model in the second image; and
  generating an output video stream comprising the first image and the second image to be played back in chronological order.

14. The non-transitory, computer-readable storage medium of claim 13, wherein the instructions for receiving the plurality of images further cause the one or more processors to perform operations comprising capturing, at an unmanned vehicle, a plurality of frames corresponding to a video stream.

15. The non-transitory, computer-readable storage medium of claim 14, wherein the instructions further cause the one or more processors to perform operations comprising transmitting the output video stream from the unmanned vehicle to a controller.

16. The non-transitory, computer-readable storage medium of claim 13, wherein the instructions for sequentially inputting the plurality of images into each of the plurality of machine learning models to obtain the plurality of sets of objects from the plurality of machine learning models further cause the one or more processors to perform operations comprising:
  inputting the first image into each of the plurality of machine learning models;
  receiving output from the first machine learning model of the plurality of machine learning models;
  determining that a subset of images of the plurality of images has been input into the second machine learning model of the plurality of machine learning models, wherein the subset of images comprises multiple images; and
  inputting a last image of the subset of images into the first machine learning model while refraining from inputting other images of the subset of images into the first machine learning model.

17. The non-transitory, computer-readable storage medium of claim 16, wherein the instructions for generating the output video stream further cause the one or more processors to perform operations comprising inputting the plurality of images into the first machine learning model and into the second machine learning model.

18. The non-transitory, computer-readable storage medium of claim 13, wherein the instructions further cause the one or more processors to determine a plurality of object types to be recognized in the plurality of images by:
- receiving, from a controller at an unmanned vehicle, a command to perform object recognition, wherein the command comprises a plurality of indications of the plurality of object types; and
- determining the plurality of object types based on the plurality of indications.

19. The non-transitory, computer-readable storage medium of claim 13, wherein the instructions further cause the one or more processors to perform operations comprising:
- retrieving, for each machine learning model available at an unmanned vehicle, one or more object types that each machine learning model has been trained to identify; and
- selecting, based on comparing a plurality of object types with the one or more object types that each machine learning model has been trained to identify, the plurality of machine learning models for processing the plurality of images.

20. The non-transitory, computer-readable storage medium of claim 13, wherein the instructions further cause the one or more processors to perform operations comprising:
- monitoring, on an unmanned vehicle, resource utilization of each of the plurality of machine learning models;
- determining that the resource utilization of the first machine learning model of the plurality of machine learning models meets a threshold;
- in response to determining that the resource utilization of the first machine learning model of the plurality of machine learning models meets the threshold, modifying input of the plurality of images into the first machine learning model; and
- in response to determining that after modifying the input of the plurality of images, the resource utilization of the first machine learning model still meets the threshold, stopping the input of the plurality of images into the first machine learning model while continuing the input of the plurality of images into all other machine learning models of the plurality of machine learning models.

* * * * *